Oct. 8, 1963 D. B. FLAVAN, JR 3,106,616

REPEATER SYSTEM FOR CODE TRANSMITTER

Filed Jan. 7, 1959 5 Sheets-Sheet 1

INVENTOR
DAVID B. FLAVAN JR.
By Sutherland, Polster & Taylor
ATTORNEYS.

INVENTOR:
DAVID B. FLAVAN JR.
By Sutherland, Polster & Taylor
ATTORNEYS.

REPEATER SYSTEM FOR CODE TRANSMITTER

Filed Jan. 7, 1959 5 Sheets-Sheet 3

INVENTOR:
DAVID B. FLAVAN JR.
By Sutherland, Polster & Taylor
ATTORNEYS.

REPEATER SYSTEM FOR CODE TRANSMITTER

Filed Jan. 7, 1959

5 Sheets-Sheet 4

INVENTOR:
DAVID B. FLAVAN JR.

BY Sutherland, Polster & Taylor
ATTORNEYS.

INVENTOR:
DAVID B. FLAVAN JR.
By Sutherland, Polster & Taylor
ATTORNEYS.

United States Patent Office 3,106,616

Patented Oct. 8, 1963

3,106,616

REPEATER SYSTEM FOR CODE TRANSMITTER

David B. Flavan, Jr., 10915 St. Boniface Lane, St. Ann, Mo.

Filed Jan. 7, 1959, Ser. No. 785,507
13 Claims. (Cl. 179—84)

This invention concerns recycling systems for code transmitters, and particularly systems in which a code transmission is automatically repeated at predetermined time intervals in response to answer signals of a predetermined nature triggered by the code transmission until changed conditions at the answering station cause a different answer signal to be given. The device of this invention is the recycler portion of a recycling system comprising a communication instrument, a code transmitter, and the recycler device described herein. The communication instrument and the code transmitter may be of any convenient type. As a matter of illustration only, the code transmitter used may be that disclosed in the co-pending application Serial No. 605,545, filed August 16, 1956, of David B. Flavan, Jr., for Multi-Sequence Pulse Code Transmitter, now Patent No. 3,074,059.

Although the present invention has many uses in the communications and remote control fields, its principal utility is found in the telephone art. It frequently happens that a dialed number is busy at the time of the call and remains busy for a considerable length of time. In the past it was necessary for the calling party to re-dial the number from time to time until it was no longer busy—a nuisance familiar to every telephone subscriber. The device of the present invention is designed to relieve the telephone subscriber from the burden of re-dialing the busy number. To that effect, the present device will continue to dial, at regular intervals, any predetermined number set up on the automatic dialer with which it is associated, until it gets a ringing signal. The device will then notify the calling subscriber of that fact so that the calling subscriber may pick up his receiver and start the conversation. An optional modification of the device further enables it to re-dial, at longer intervals, a number on which a ringing signal has appeared but the called party has failed to answer.

Basically, the device of this invention operates on a principle which takes advantage of the fact that there are certain identifying characteristics consisting of frequency, repetition rate, and amplitude which distinguish the dial tone, busy signal, and ringing signal from one another. The frequency and the amplitude of the dial tone and busy signal are the same; but the dial tone is continuous whereas the busy signal is interrupted at regular intervals. Furthermore, in the process of establishing a telephone connection, the dial tone will always be the first signal heard, and any subsequent signal of the same frequency or amplitude as the dial tone will be a busy signal. Based on these identifying characteristics of the various signals used in telephony, the present device operates by amplifying the signals received over the telephone line, and channeling them into appropriate actuating circuits according to their characteristics. The actuating circuits in turn are designed to operate (1) the aforesaid automatic dialer in response to a dial tone; (2) an interval timer and recycling circuit in response to a busy signal; and (3) an indicator circuit in response to a ringing signal.

It is therefore the object of this invention to provide a device which first determines the availability of a communications channel, then causes an interrogating code transmission to be sent over the channel when available, then determine the condition of the receiving device from the nature of an answering signal triggered by the code transmission, and then to either repeat the interrogating transmission after a fixed period of time or to indicate readiness for a communication, depending on the nature of the answer signal given.

It is a further object of this invention to provide a device which will automatically dial a telephone number at regular intervals until a ringing signal is obtained from the called number. The actual operation of the device in response to signals having various characteristics will be understood from the following description taken in connection with the accompanying drawings in which.

Figure 1:
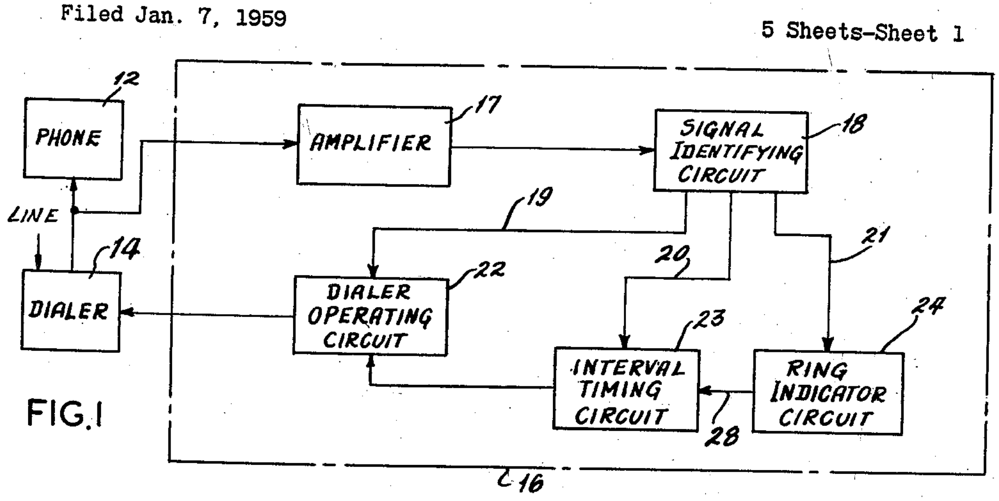
FIGURE 1 is a basic block diagram showing the overall theory of operation of the device of this invention.

The present recycler consists of an attachment to be used with any ordinary telephone equipped with an automatic dialing device of any appropriate construction or type. As shown in FIG. 1, the recycling apparatus 16 is so connected to the telephone set 12 and the automatic dialer 14 that signals received from the telephone line will be first fed into an amplifier 17. The amplified signals are then fed into a signal identifying circuit 18 which may be of several types, depending on which characteristics of the incoming signals are to be used for their identification. Regardless of which kind of signal identifying circuit is used, it will always have three outputs: a first output 19 associated with a dial tone, a second output 20 associated with a busy signal, and a third output 21 associated with a ringing signal. Energization of the first output 19 in response to a dial tone actuates appropriate circuits 22 for setting the automatic dialer into motion. When the automatic dialer has completed its cycle, one of two things will happen: either a busy signal will come over the line, or else a ringing signal will come over the line. If a busy signal appears, the second output 20 of the identifying circuit will be energized, and such energization will be fed to appropriate circuitry 23 to initiate a time interval which may be adjustable and which, for purposes of illustration, we will take to be five minutes. The same circuit which initiates the time interval also disconnects the recycler from the telephone line (see FIGS. 2–4), so that telephone conversations with other parties may be conducted during this five minute interval. At the expiration of the five minute interval, the timer causes the recycler to be reconnected to the telephone line and thus indirectly causes the dialer operating circuit to function, since, as explained hereafter, the connection of the recycler to the telephone line will result in a dial tone appearing on the line. As the connection between timing circuit 23 and dialer operating circuit 22 is thus a cause-and-effect connection rather than a physical connection, it is indicated by a dotted line in FIG. 1. (Of course, in applications outside the telephone art where line availability is no problem, the timer circuit 23 can be directly connected to the dialer operating circuit 22.) It will be noted that if the conversation with a third party which may have been initiated during the five minute interval is still going on at the time the five minute interval is over, no dial tone will appear in the system when the recycler 16 is reconnected to the line, and consequently the recycler 16 will wait until the previous conversation has been concluded and a dial tone appears before causing a redialing operation. If, in answer to any dialing operation, a ringing signal appears on the line, the identifying circuit 18 will energize the third output 21, and this energization will cause actuation of an indicating device 24 such as a buzzer, light, or loudspeaker, which will let the subscriber know that the called party's phone is ringing and that the subscriber may now take over manually by picking up the receiver. As discussed hereinafter, suitable lock-out circuitry (see FIGS. 2–4) may also be provided in the event the subscriber has left the room during the five minute waiting period, or for some other reason fails to pick up the receiver. This lock-out circuitry will prevent the recycling system from again actuating the dialing mechanism and will shut off the recycler and disconnect it from the telephone line after a reasonable period of time, e.g. one minute, following the appearance of a ringing signal on the line. In addition, circuitry may be provided to repeat the dialing operation after about twenty minutes if a ringing signal appears but the called party fails to answer, as indicated by arrows 28.

Figure 2:
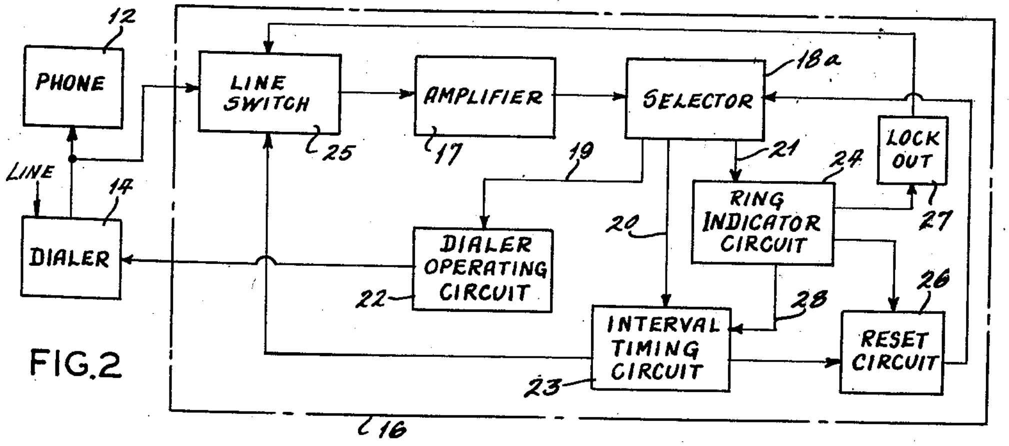
FIGURE 2 is a block diagram of the device as adapted to respond to the repetition rate characteristics of the signals.

FIGURE 2 is a block diagram representing a recycling system in which the identifying characteristic of the signal is its repetition rate. The identification of the signals is accomplished by a selector 18a consisting of an impulse relay (110 in FIG. 7) which is so constructed as to assume various predetermined contact positions, depending on the number of individual tone impulses conveyed to it during a predetermined period of time. The dialer operating circuit 22 operates in the same manner as described above in connection with FIGURE 1; the interval timing circuit 23 is connected to a line switch 25 which opens the telephone line during the time interval; and the ring indicator circuit operates as described above in connection with FIGURE 1. In addition, a reset circuit 26 is provided to be actuated by both the ring indicator circuit 24 and the interval timer circuit 23 for resetting the selector 18a to its neutral position so as to enable it to appropriately count the tone pulses upon initiation of the next call cycle. A safety lock-out circuit 27 opens the line switch 25 and stops the recycler 16 a predetermined time after the ring indicator circuit 23 has been actuated.

Figure 3:
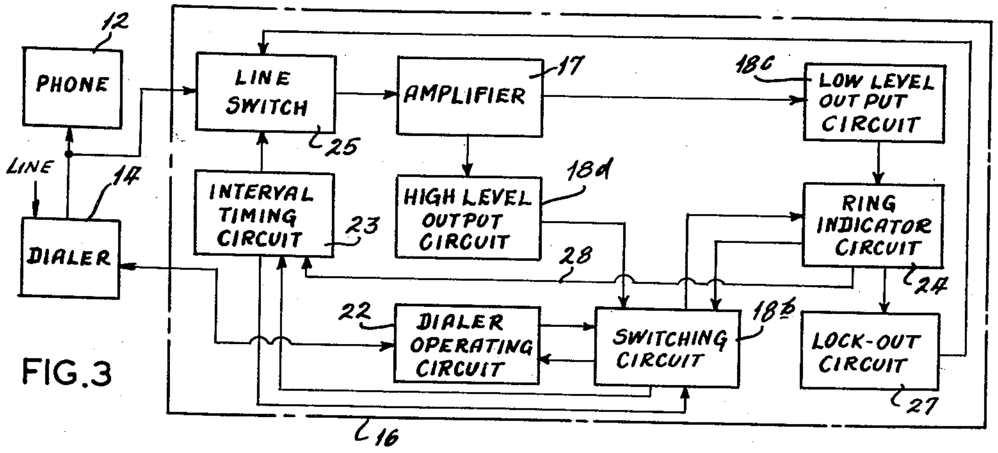
FIGURE 3 is a block diagram of the device as adapted to respond to the amplitude characteristics of the signals.

FIGURE 3 is a block diagram showing a recycler using the relative amplitude of the telephone signals for identification. It is known that the amplitude of the dial tone and busy signal is always larger than the amplitude of the ringing signal in any given installation. Since, however, the amplitude of the dial tone and that of the busy signal are always alike, it is necessary to provide a switching circuit 18b which distinguishes between the dial tone and the busy signal on a time basis, i.e. in any given cycle, the dial tone will always occur first and the busy signal thereafter. Furthermore, since a low-level signal will energize only the low-level output 18c, but a high-level signal will energize both the low-level output 18c and the high-level output 18d, it is necessary to tie the ring indicator circuit 24 into the switching circuit 18b in such a manner that the presence of a high-level signal will prevent the ring indicator circuit 24 from operating.

Since no selector relay is used, no reset circuit is necessary in this embodiment. In all other respects, the circuit of FIGURE 3 is similar to that described above in connection with FIGURE 1.

Figure 4:
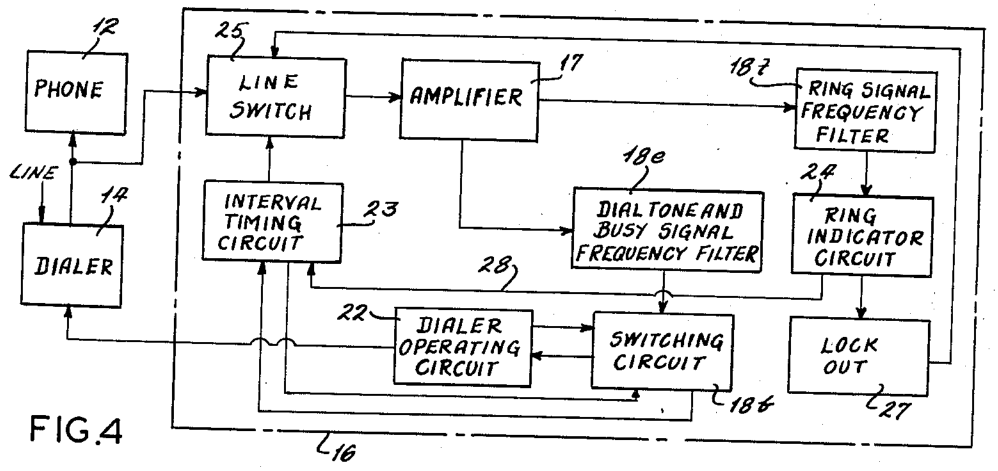
FIGURE 4 is a block diagram of the device as adapted to respond to the frequency characteristics of the signals.

FIGURE 4 shows, in block diagram form, the layout of an embodiment which uses the frequency characteristics of the signals for identification. Except for the use of band-pass filters (or tuned amplifiers) 18e, 18f in lieu of the low-level and high-level outputs 18c, 18d, the operation of this embodiment is identical to that of the amplitude-responsive embodiment shown in FIGURE 3. Inasmuch as the dial tone and the busy signal have the same frequency, a switching circuit 18b is again necessary in this embodiment to distinguish between the dial tone and busy signal on a sequence-of-occurrence basis; but since only one filter will pass a signal at any given time, no interlock between the switching circuit 18b and the ring indicator circuit 24 is necessary.

Figures 5, 6:
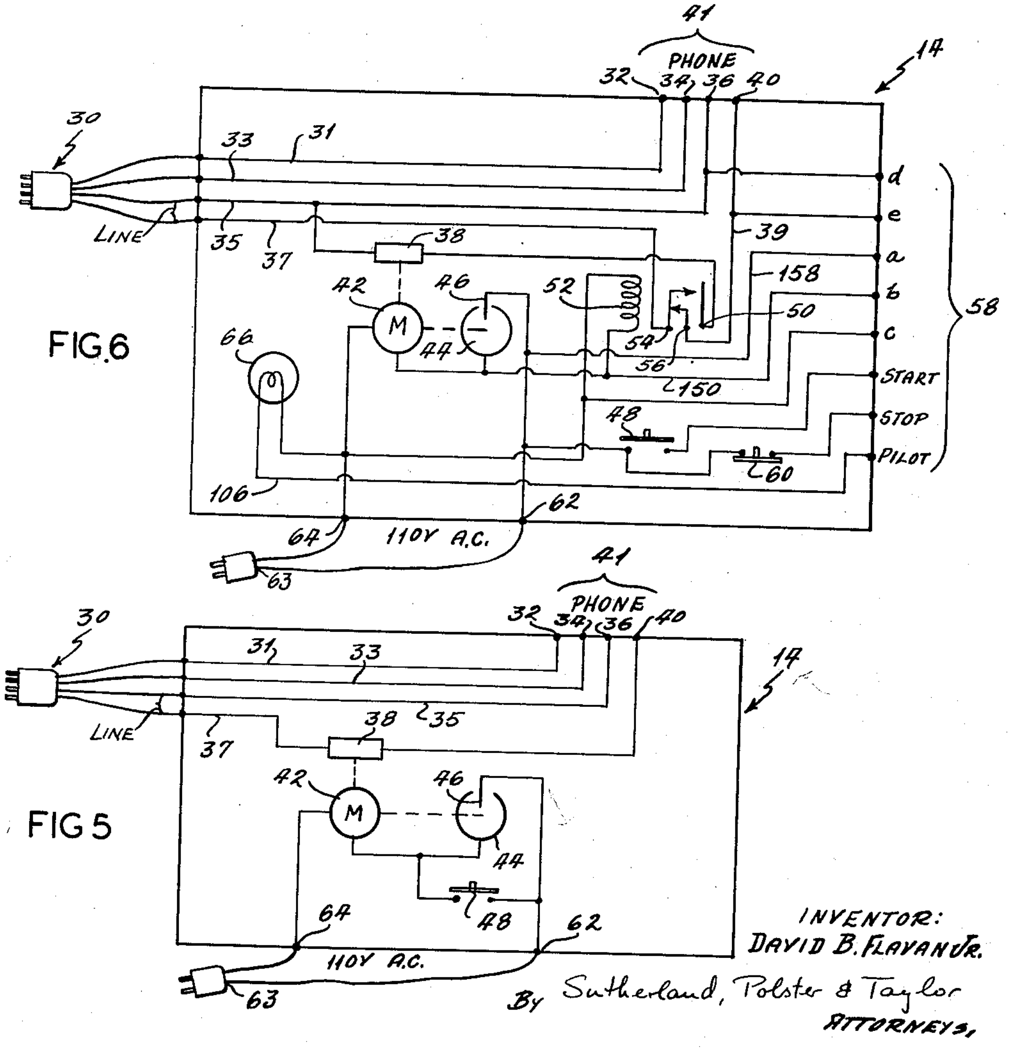
FIGURE 5 is a circuit diagram showing the basic mode of operation of the automatic dialer disclosed in the aforesaid Patent No. 3,074,059.
FIGURE 6 is a circuit diagram showing the necessary modifications of the circuit of FIGURE 5 to permit its use with the device of this invention.

FIGURE 5 shows the basic circuitry of the automatic dialer disclosed in Patent No. 3,074,059. It will be seen that the four wires of the telephone line are brought into the device through the four-pole plug and cable 30. Three of the wires (31, 33, 35) go directly to terminals 32, 34 and 36 of the socket 41 into which the telephone is plugged. The fourth wire (37, 39) has inserted therein an element 38 which is interposed between the portions 37 and 39 of the fourth wire. Element 38 represents the dialing element which is actuated by a motor 42 powered by a 110 volt supply 63. Element 38 may either be an interrupting mechanism as described in Patent No. 3,074,059, which causes wire 37, 39 to be momentarily interrupted at rapid intervals in a pre-set pattern representing the number to be dialed, or it may be a tone-generating device which injects a series of tones into the circuit of which wire 37, 39 is a part, the pitch of each tone being representative of a numeral to be dialed. A gap in a contact ring 44 mounted on the commutator of the automatic dialer, which in turn is rotated by the motor 42, cooperates with a stationary contact finger 46 to stop the motor 42 after the dialer has run through a complete seven digit cycle. A push-button switch 48 is provided for momentarily by-passing the contact ring 44 and contact finger 46 so as to start the motor 42 when it is desired to dial a number automatically. Although this discussion refers to only one "switch 48" it will be understood that this "switch 48" can be any one of many individual push-button switches 48 all connected in parallel, so that pushing any one of them will close the by-pass circuit. The switches 48 consist of a contact plate mounted on the bottom of each of the push buttons 49 (FIG. 10) by which the individual pre-set telephone numbers are selected. As one push button is depressed, its contact plate momentarily closes a pair of override contacts connected in parallel with the override contacts of all the other selector buttons 49, the closing being long enough to start the motor 42. As soon as motor 42 starts, finger 46 engages ring 44 and maintains the circuit which energizes motor 42. When the depressed selector button is released, the switch 48 is opened and the running of the motor 42 is then governed only by the contact ring 44 and contact finger 46. The exact functioning of the automatic dialer is described in Patent No. 3,074,059 and will not be gone into any further at this point.

In order to adapt the automatic dialing device of Patent No. 3,074,059 to the present purpose some circuitry changes must be made therein. The modified version of the automatic dialer is shown in FIGURE 6. In FIGURE 6, 30 once again designates the four-pole plug and cable by which the device is plugged into the telephone line. The telephone itself is plugged into the four-pole socket 41 and it will be seen that wires 31 and 33 remain unchanged. The left-hand side of element 38, however, is now connected to wire 35 instead of 37. The right-hand side of element 38 is connected to the normally open contact 50 of a make-before-break relay 52. The wire 37 is connected to the center contact 54 of relay 52, while the normally closed contact 56 of relay 52 is connected to wire 39 leading to the terminal 40 of the phone socket 41. The coil of relay 52 is connected in parallel with dialer motor 42. The reason for this change is that the automatic dialer disclosed in Patent No. 3,074,059 is designed to operate only while the phone is off the hook. In that condition, an electrical circuit is established from terminal 36 through the earpiece winding of the telephone receiver back to terminal 40, so that an electrical circuit will be completed between wires 35 and 37. Interruption of this electrical circuit, or injection of tones therein, by element 38 provides the dialing impulses which operate the dialing equipment in the telephone company's central office. In the device of the present invention, it is essential that the device be operative while the telephone receiver is on its cradle, since it would be defeating the device's purpose if the receiver had to be lifted each time the number was redialed. When the telephone receiver is on its cradle, the circuit between terminals 36 and 40 is broken. It is therefore necessary in order to dial to short circuit wires 35 and 37 through element 38. Relay 52 accomplishes this purpose during the time that the dialer motor is running. At all other times, relay 52 causes wire 37 to be connected directly to wire 39, so that the telephone set will be connected to the line as if the dialer were not there.

In FIGURE 6 the switch 48 remains connected to the finger 46, and hence to the "hot" side of the 110-volt line, at one of its terminals. (For the purposes of this specification, the side of the 110 volt line 63 corresponding to terminal 62 will be referred to as the "hot" side of the 110 volt line, whereas the side associated with terminal 64 will be referred to as the "ground" side of the 110 volt line.) However, since, when the recycler is used, the dialer is not to be started until a dial tone appears on the line, switch 48 will be used to start the recycler instead of the dialer. Therefore, the other terminal of switch 48 is connected to the "start" terminal of the eight-pole socket 58. This connection will, in a manner hereinafter described, cause the recycler to start its cycle. An additional push-button 60 is provided in the modified automatic dialer in order to stop the recycler when the subscriber, for example, wishes to leave his office and is no longer interested in establishing the communication. Button 60 is of the normally closed type and is connected on one side to the "hot" side of the 110 volt power supply line. The other side of push button 60 is connected to the "stop" terminal of eight-pole socket 58 for a purpose hereinafter explained. A pilot light 66 is further provided to inform the subscriber of the fact that the recycler is operating. One side of the pilot light 66 is connected to the ground side of the 110 volt line, whereas the other terminal of light 66 is connected to the "pilot" terminal of eight-pole socket 58 from whence it is connected to the recycler in a manner hereinafter described. It will be seen from an inspection of FIGURE 6 that the terminals "*d*" and "*e*" of the eight-pole socket 58 correspond electrically to terminals 36 and 40, i.e., the earpiece coil terminals, of the telephone socket. Likewise, it will be apparent that terminal "*a*" of socket 58 corresponds to the "hot" side of the 110 volt line; that terminal "*c*" of socket 58 corresponds to the "ground" side of the 110 volt line; and that terminal "*b*" of socket 58 will be energized whenever motor 42 is energized. Of course, if energy is supplied to terminal "*b*" from the outside, this energy will be transmitted to motor 42.

It will be readily understood from the above that the nature of the dialer used (i.e., electrical, mechanical, electronic, punched-tape etc.) is immaterial as long as it has the following features:

(1) Dialing element connected directly across the telephone line during the dialing operation;

(2) A lock-in circuit which keeps the dialer energized until completion of its cycle after the dialer has been started by a momentary supply of energy;

(3) At least one "start" button, "stop" button, and pilot light (which may of course be placed on the recycle box if desired).

For the purposes of this discussion, the various contacts of the relays will hereinafter be identified as follows: the first figure will be the reference numeral associated with particular relay. This number will be followed by a capital letter designating the particular contact section of the relay; A designating the topmost one, B the next lower one, and so forth. The capital letters will be followed by a number which indicates the particular contact of the designated section. In this respect, the number 1 will designate the center contact, 2 the normally closed contact and 3 the normally open contact. For example, the designation "contact 94A3" will mean the normally open contact of the uppermost section of relay 94.

Figure 7:
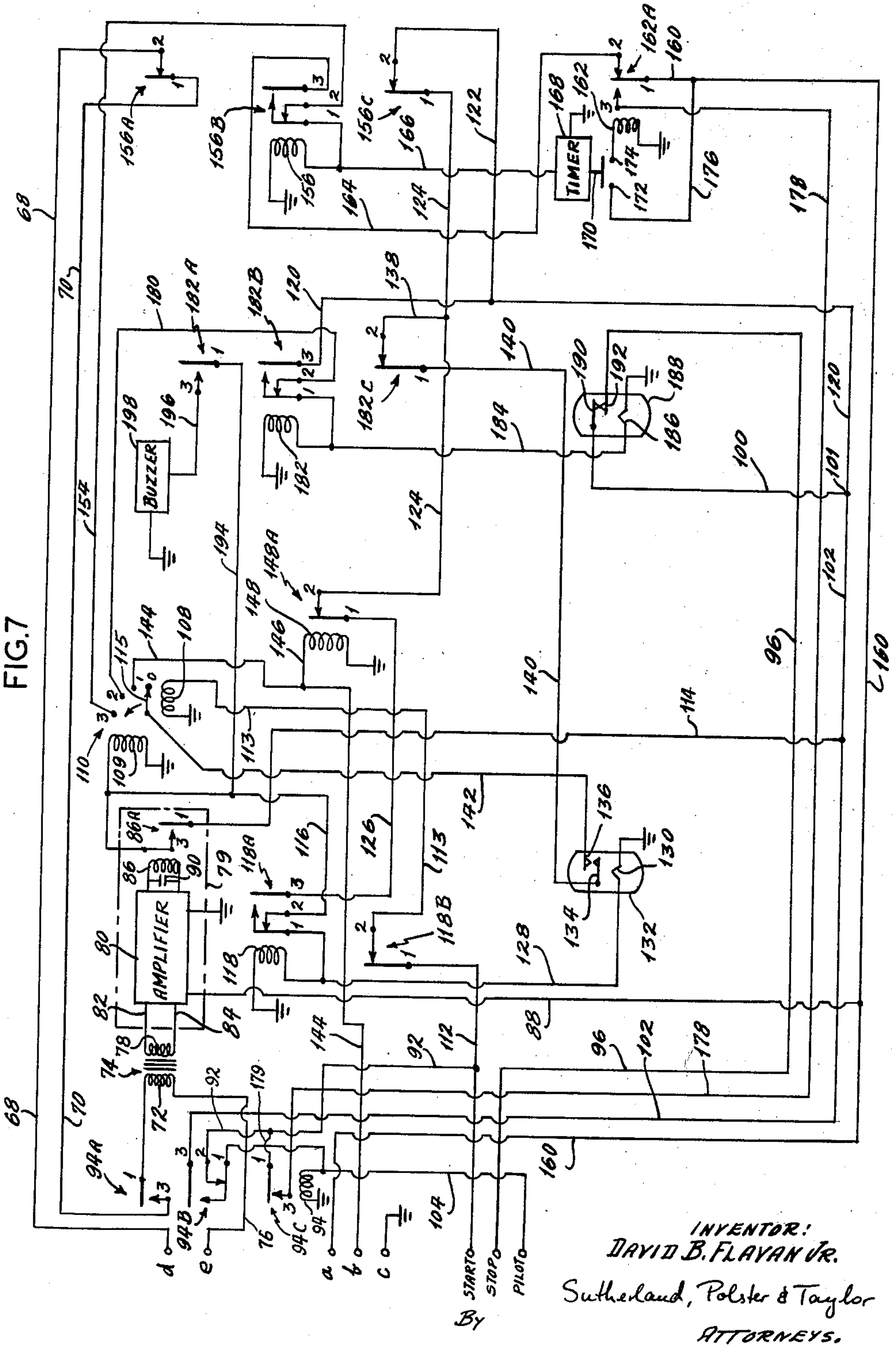
FIGURE 7 is a circuit diagram of a recycler constructed in accordance with this invention and responsive to the repetition rate characteristics of the signal.
Figure 8:
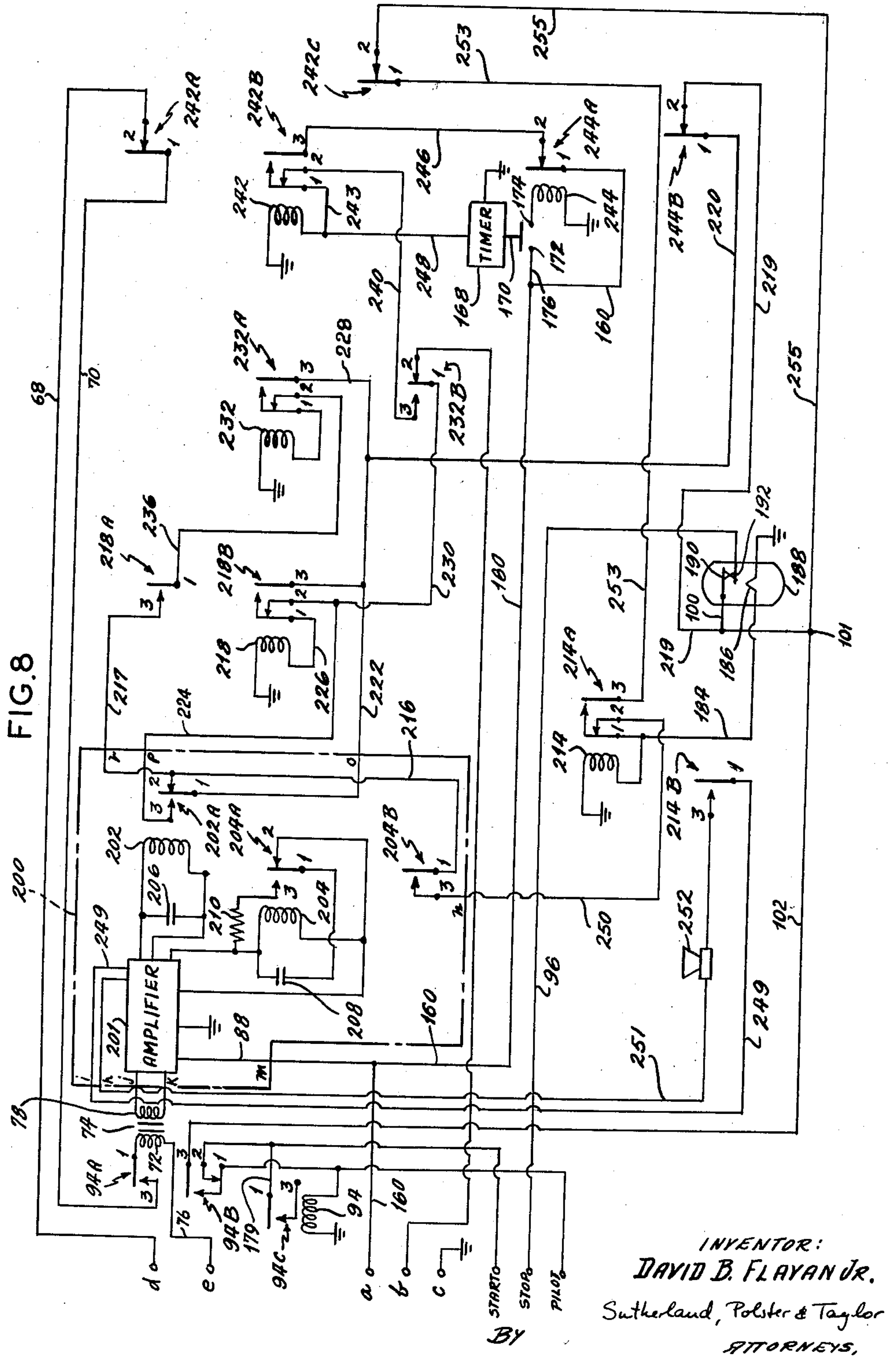
FIGURE 8 is a circuit diagram of a recycler constructed in accordance with this invention and responsive to the amplitude characteristics of the signal.
Figures 9, 10, 11:
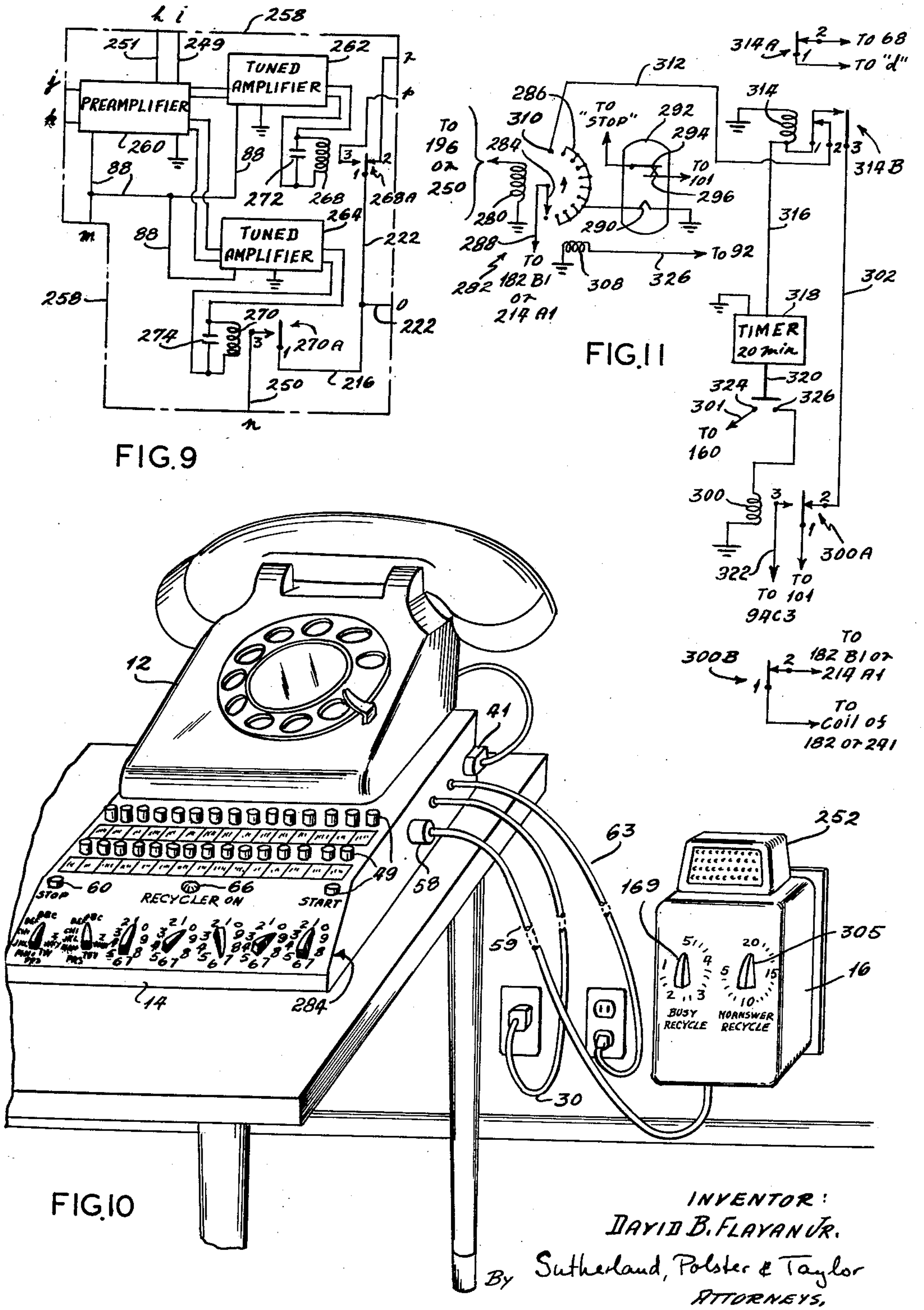
FIGURE 9 is a circuit diagram showing an alternative amplifier unit which, when substituted for the amplifier unit of FIG. 8, makes the recycler of FIG. 8 responsive to the frequency characteristics of the signal.
FIGURE 10 is a perspective outside view of a system using this invention.
FIGURE 11 is a circuit diagram showing an optional additional circuit for use with the circuits of FIGS. 7–9.

Turning now to FIGURE 7, the terminals "*d*", "*e*", "*a*", "*b*", "*c*", "start", "stop" and "pilot" are shown at the extreme left. These eight terminals are connected to the corresponding terminals of socket 58 by any suitable eight-wire cable 59 (FIG. 10). This permits the recycler as shown in FIGURES 7, 8 and 9 to be mounted at any convenient out-of-the-way place remote from the telephone and automatic dialing device. Throughout the diagrams of FIGURES 7–9, the 110 volt "ground" connection has been designated by the customary symbol in order to improve the clarity of the drawing.

The circuit of the telephone line is completed from terminal "*d*" through wire 68 and the normally closed contacts 156A2 and 156A1 of relay 156 to wire 70, and from there through normally open contacts 94A3 and 94A1 of relay 94 and through the primary coil 72 of an impedance-matching audio transformer 74 back to terminal "*e*" through wire 76. The primary winding 72 of audio transformer 74 is so designed as to be the electrical equivalent of the coil of a telephone receiver, so that the above-described circuit from "*d*" to "*e*", when closed, will simulate, as far as the telephone central office is concerned, the receiver attached to terminals 36 and 40 (FIG. 6). The secondary winding 78 of transformer 74 is so designed as to present a proper input impedance to amplifier 80 of amplifier unit 79. It will be understood that under these conditions, any alternating-current signal appearing on the telephone line will be fed into amplifier 80 at 82—84. The amplifier unit 79 is a so-called voice control amplifier, of which many different types are available on the open market. For example, the Model VX–1 electronic voice control unit manufactured by the Heath Company of Benton Harbor, Michigan, could be used for this purpose, provided its output relay 86 is so adjusted as to respond only to a steady signal, but not to speech. If appropriate adjustment is not possible, a separate speech-remover circuit such as described on pp. 60, 61, and 191 of the March 1948 issue of Radio & TV News may be incorporated in the amplifier 80.

Basically, an electronic voice control consists of a circuit which receives a low-level electrical signal, amplifies it, and actuates a relay 86 whenever the signal is present. Electric power is continuously delivered to the amplifier 80 over wire 88. Wire 88 is connected to terminal "*a*" which in turn is connected to the "hot" side of the 110 volt supply in the automatic dialer of FIGURE 6. Thus, amplifier 80 will be ready at all times to respond to any signal which may appear at its input 82, 84. Inasmuch as there may be a number of spurious clicks or switching transients on the telephone line, particularly right after the end of the dialing operation, the capacitor 90 is provided so as to prevent operation of the relay 86 until a signal has persisted for a sufficient length of time to assure that it was not merely a spurious click. Commerical amplifiers such as the one identified above usually incorporate a sensitivity adjustment circuit which may make the capacitor 90 unnecessary.

Operation of the recycler is initiated by selecting the number to be called on the automatic dialer 14 (FIG. 10) and depressing the selector button 49 corresponding to that number all the way down. This will result in momentarily closing switch 48 in FIGURE 6. It will be remembered that the closing of switch 48 momentarily energizes the "start' terminal of socket 58 in FIGURE 6. This energization is transferred through the connecting cable 59 to the "start" terminal on the left-hand side of FIGURE 7, from where the electric current will travel through wire 92 to contact 94B2 of make-before-break section B of relay 94. Since relay 94 has not previously been energized, and since its contacts are therefore in the position shown, the current will travel on to contact 94B1 and from there to the right-hand side of the coil of relay 94. Relay 94 will thereupon become energized and will attract its armature so that the contact arm 94B3 will make contact with 94B1. After this contact has been established, further motion of the contact arm 94B3 will cause the contact between 94B2 and 94B1 to be broken. In this condition, the relay 94 will lock itself in the energized position, the current flow necessary to achieve this being as follows: from the "hot" 110 volt terminal 62 (FIG. 6) through normally closed push button 60 the "stop" terminals, wire 96, normally closed contacts 190, 192 of delay relay 188, and wires 100 and 102 to contact 94B3, and hence through contact 94B1 to the coil of relay 94. At the same time that the coil of relay 94 becomes energized, the pilot light 66 becomes energized through wire 104 and the "pilot" terminals to which pilot light 66 is connected (wire 106, FIGURE 6).

The energization of the "start" terminals further actuates the reset coil 108 of the stepping relay 110 through wire 112, contact 118B1, contact 118B2 and wire 113 so that regardless of the position of stepping relay 110 at the end of the previous cycle, it will be in the reset position as the recycler starts operating. Section B of relay 118 is provided in this circuit to prevent the reset coil from being accidentally actuated if a button 49 is pushed while the stepping relay is in operation. As soon as push button 49 is released, the reset coil 108 is no longer energized because the "start" terminals lead to a dead end on the right-hand side of switch 48 and because contact 94B2 is no longer connected to anything.

The energization of relay 94 has also resulted in a contact being established between contacts 94A1 and 94A3. This closes the telephone line circuit from *d* to *e* as described above and thereby simulates picking up the receiver. This in turn results in a dial tone appearing on the telephone line. The dial tone is fed into the input 82—84 of amplifier 80 through transformer 74, and the amplified dial tone will cause relay 86 to become energized. As relay 86 is energized, an electrical circuit is established as follows: from point 101 (which is always energized unless the "stop" button 60 is pushed or delay relay 188 operates) over wires 102 and 114 to contact 86A1, thence to contact 86A3 and on to the stepping coil 109 of relay 110. This current impulse will cause the switching arm 115 of stepping relay 110 to step from the "0" to the "1" position. At the same time, current will flow from contact 86A3 over wire 116 to contact 118A2, and hence through contact 118A1 to the coil of make-before-break relay 118. As the coil of relay 118 is thus energized, contact 118A2 will disconnect itself from contact 118A1, but power will continue to be supplied to the coil of relay 118 from point 101 over wires 120 and 122 to contact 156C2; hence through contact 156C1 and wire 124 to contact 148A2; hence through contact 148A1 and wire 126 to contact 118A3, which makes contact with 118A1 (to which the coil of relay 118 is connected) before 118A1 and 118A2 separate. It will be seen that relay 118 has now locked itself in the energized position and will remain so until its supply circuit is broken in section A of relay 148.

At the same time that the coil of relay 118 is energized, current is supplied over wire 128 to the heater 130 of delay relay 132. Delay relay 132 is designed to close its normally open contacts 134, 136 two seconds after energization of the heater 130. Relay 132 may be of any convenient type which accomplishes this purpose, such as, for example, Model 115 NO 2 manufactured by the Amperite Corporation. Two seconds after energization of heater 130, contacts 134 and 136 will thus close and an electric circuit will be established as follows: From point 101 over wires 120 and 122 to contact 156C2; hence through contact 156C1 and wires 124 and 138 to contact 182C2; hence from contact 182C1 through wire 140 to contact 134; hence through contact 136 and wire 142 to the switching arm 115 of stepping relay 110 hence through contact "1" of stepping relay 110 over wires 144 and 146 to the coil of relay 148. At the same time, current will also travel through wire 144 and terminals "*b*" to motor 42 and relay 52 of the automatic dialer of FIGURE 6. As soon as the coil of relay 148 is energized, the connection between contacts 148A1 and 148A2 will be broken, cutting off the current supply over wire 126 to contact 118A3. This will cause relay 118 to release its armature, and since there is no signal on the line at this moment (because relay 52 cuts the recycler off the line during the dialing operation, as will be explained hereafter), relay 86 will be de-energized and consequently relay 118 will stay released. At the same time, current flow is cut off to the heater 130 of delay relay 132, and a fraction of a second later, the contacts 134 and 136 of relay 132 will separate. This separation would normally take away the power supply to the coil of relay 148, but in the meantime the motor 42 of the dialer in FIGURE 6 has turned enough so that contact finger 46 has engaged contact ring 44 on the dialer's commutator, so that the motor 42 will not only continue to turn but current will be fed back from "hot" terminal 62 through elements 46, 44 and wire 150 to terminals "*b*," and hence over wires 144 and 146 back to the coil of relay 148. It will therefore be seen that relay 148 will stay energized until the dialer has completed its dialing cycle and the contact between finger 46 and ring 44 (FIGURE 6) has been broken. During the time that the motor 42 in FIGURE 6 is operating, relay 52 will be energized, so that wire 37 is short circuited through contacts 54 and 50 and interrupter 38 to line 35. At the same time, while relay 52 is energized, wire 39 dead-ends at contact 56, assuming of course that the telephone receiver is still on its cradle and that there is hence no connection between terminals 36 and 40. Inasmuch as terminals "*e*" are thus not connected to anything, there can be no signal in the primary winding 72 of transformer 74 during the time that the automatic dialer is operating.

When the automatic dialer has completed its cycle, contact finger 46 rides off contact ring 44 and de-energizes wires 150. This causes both relays 52 and 148 to drop out and causes motor 42 to stop. As relay 52 drops out, contacts 54 and 50 separate, removing the short circuit between lines 35 and 37. At the same time the circuit is closed between contacts 54 and 56, so that wire 39 and thus terminal "*e*" becomes connected to line 37. In this condition, the primary coil 72 of the transformer 74 is once again connected across the telephone line so as to pick up any signals which will appear on the line. Supposing that the called telephone is busy, a busy signal will presently appear on the line. This busy signal will be amplified by amplifier 80 and will cause relay 86 to rhythmically close and open in accordance with the individual beeps of the busy signal. It will be remembered that arm 115 of stepping relay 110 is at the present time in position "1" and that wire 142 is dead because contacts 134, 136 are open and wire 144 is also dead. At the first beep of the busy signal, relay 86 will close, establishing a circuit between contacts 86A1 and 86A3. Current will now flow from point 101 through wires 102 and 114 to contact 86A1, and hence through contact 86A3 to the stepping coil 109 of relay 110. The switching arm 115 of stepping relay 110 will therefore move to position "2." At the same time, current will flow through wire 116, and relay 118 will lock itself in the energized position as described above. While relay 118 remains energized, contact 118A2 is not connected to anything and therefore does not influence the operation of the stepping relay. At the end of the first beep of the busy signal, the contacts 86A1 and 86A3 will open, only to reclose again when the second beep of the busy signal starts. At the start of the second beep, the stepping coil 109 of relay 110 will therefore move the switching arm 115 of relay 110 to position "3." Although the heater 130 of relay 132 is at this time in the process of heating up, the contacts 134, 136 of relay 132 have not yet closed, and therefore no current is flowing as yet through the switching arm 115 of stepping relay 110. As the busy signal continues, the stepping coil 109 of relay 110 will continue to receive additional impulses, but since the switching arm 115 of relay 110 has reached the end of its travel, it can go no farther, and thus any subsequent current impulses to the stepping coil will have no effect on the circuit. When two seconds have elapsed, the contacts 134, 136 of relay 132 will close. In the same manner as described above, current flow will therefore be established to wire 142 and through switching arm 115 and contact "3" of stepping relay 110 and wire 154 to contact 156B2 of relay 156. Since relay 156 is not yet energized, current will flow from contact 156B2 through contact 156B1 into the coil of relay 156. This will cause relay 156 to attract its armature, and although the circuit between contacts 156B1 and 156B2 will thereupon be broken, current flow to the coil of relay 156 will be maintained as follows: from the "hot" 110 volt terminal 62 of FIGURE 6 over wire 158 to terminal "*a*"; thence over wire 160 (FIGURE 7) to contact 162A1 of relay 162; thence over 162A2 and wire 164 to contact 156B3 and hence over contact 156B1 to the coil of relay 156.

Energization of relay 156 also has two other effects: section A of relay 156 breaks the circuit between wires 68 and 70 and thus disconnects the recycler from the telephone line. Section C of relay 156 opens the circuit between wires 122 and 124 and thus cuts off the power supply to relay 118 (via 124, 148A2, 148A1, 126) and heater 130 of relay 132. At the same time that relay 156 is energized, current is supplied over wire 166 to the interval timer 168. The interval timer 168 is preferably a motor-driven timing device of any one of numerous types available on the market. This timing device is generally known in the art as a "fly-back" timer. It is so constructed that after a predetermined time which can be set as desired by a control knob 169 (FIG. 10), the plunger 170 momentarily connects together the terminals 172 and 174.

In the above-described condition (i.e., relay 156 energized), the recycler is electrically removed from the telephone line and remains inactive while the motor of timer 168 is running. At the expiration of the time interval, which, as previously stated, may be on the order of five minutes, plunger 170 of timer 168 will momentarily close the circuit between terminals 172 and 174. This will cause relay 162 to momentarily attract its armature, the coil of relay 162 being supplied with power from "hot" terminal "*a*" over wires 160 and 176. The momentary attraction of the armature of relay 162 causes contacts 162A1 and 162A2 to separate. This cuts wire 164 off from wire 160 and thus cuts off the power supply to the coil of relay 156. Relay 156 will therefore release, and at the same time, the current supply through wire 166 to timer 168 will be cut off, so that the motor of timer 168 will stop. When relay 162 releases an instant later, the re-establishing of the circuit between 162A1 and 162A2 will not cause relay 156 to become energized again, as contact 156B3 is no longer connected to anything. During the momentary energization of relay 162, a circuit is established from "hot" wire 160 through contacts 162A1 and 162A3 over wire 178 through section C of relay 94 and wires 179, 92, and 112 to contact 118B1 and thence (since relay 118 is released at this moment) through contact 118B2 and wire 113 to reset coil 108 of stepping relay 110. The momentary energization of coil 108 causes switching arm 115 to return to position "0."

At this point, it will be observed that all the components of the apparatus are in the same condition as they were immediately following the depressing and releasing of push button 49. Consequently, the machine is ready to repeat the above described operation as soon as a dial tone appears on the line.

It will be understood, incidentally, that if timer 168 is so constructed that plunger 170 momentarily opens one circuit while closing another, wire 176 and relay 162 can be omitted, and wires 160, 164, and 178 can be connected to the plunger terminals in a manner which will be obvious to those skilled in the art.

Let us now suppose that the recycler goes through its paces up to the point where a number has been dialed, but that this time a ringing signal rather than a busy signal appears on the line. Immediately before the start of the ringing signal, all the relays except relay 94 are released, and the switching arm 115 of stepping relay 110 is in position "1." As the ringing signal appears on the line, it will be amplified as described above, and relay 86 will close. In the same manner as described above, this will cause the switching arm 115 of stepping relay 110 to move to position "2" while relay 118 locks itself in the energized position. Since the individual rings of the ringing signal are spaced six seconds apart, the contacts 134, 136 of relay 130 will have an opportunity to close before the stepping relay 110 can make another step. At this moment, a circuit will be completed from point 101 over wires 120, 122, 124, 138, 140, and 142 to the switching arm 115 of stepping relay 110, from which the current will flow through contact "2" of stepping relay 110 and wire 180 to contact 182B2 of relay 182. Since relay 182 is released at this moment, current will flow from 182B2 through 182B1 to the coil of relay 182. This causes relay 182 to lock itself in the energized position, current to the coil of relay 182 being supplied, after it has attracted its armature, from point 101 over wire 120 through contacts 182B3 and 182B1. Energization of relay 182 also causes the circuit between 182C1 and 182C2 to be broken, so that wires 140, 142 and 180 go "dead." This last named operation prevents any further operation of the stepping relay 110 from having any effect on the circuit. The lock-in circuit from wire 124 through section A of relay 148 and wire 126 to relay 118 remains established, so that relay 118 will not "chatter" as subsequent rings cause the relay 86 to become energized.

A third effect of the energizing of relay 182 is the establishing of a circuit between contacts 182A1 and 182A3. This completes a circuit from point 101 through wire 102 and 114, section A of relay 86, wires 116 and 194, section A of relay 182 and wire 196 to buzzer 198. It will be seen that buzzer 198 will thus be caused to buzz each time relay 86 is energized. Consequently, the rings appearing on the line while relay 182 is energized will be translated into buzzing noises of the same duration as the ring itself. This advises the subscriber that a ringing signal has been obtained and that he should pick up the receiver of his telephone.

At the same time that relay 182 is energized, current will flow through wire 184 to the heater 186 of delay relay 188. Relay 188 may be any commercial one-minute delay relay with normally closed contacts such as Amperite's Model 115 NC 60. Hence, delay relay 188 will open its normally closed contacts 190, 192 about one minute after relay 182 is energized. This will cause an interruption of the current supply from wire 96 to wire 100. Since current is supplied from the "hot" side 62 of the 110 volt line to point 101 through "stop" button 60, wire 96, wire 112, contacts 190, 192 and wire 100, it will be readily seen that the current supply to point 101 is thus cut off. Momentary removal of the current supply to point 101 will cause momentary de-energization of wire 102. Since wire 102 at that moment is the only source of current supply to the coil of relay 94 (via contacts 94B3 and 94B1), the momentary cutting off of the current supply to point 101 will cause relay 94 to drop out, thus cutting the recycler off the telephone line. At the same time, de-energization of point 101 will de-energize wires 120, which will result in cutting off the current supply to the coils of relays 182 and 118, as well as to the heaters 130 and 186 of delay relays 132 and 188. Thus, once a ringing signal has occurred, the device will shut itself off after one minute, and any subsequent signal which may accidentally appear during that minute will not cause the machine to react because as stated above, further operation of stepping relay 110 after relay 182 is energized has no effect on the circuit.

When the called party answers, buzzer 198 will cease to buzz. Since it is conceivable that the called party may answer before the buzzer has had time to attract the subscriber's attention, it may be preferable to omit wire 194 and to connect contact 182A1 directly to wire 120, so that the buzzer will indicate the presence of a ringing signal by a continuous buzz regardless of whether the called party answers quickly or not. Or the buzzer 198, together with wires 194 and 196, may be entirely omitted, and section A of relay 182 may instead be used to energize a loudspeaker connected to the telephone line through an appropriate amplifier (see FIG. 8). The amplifier for this purpose may be combined, if desired, with amplifier 80. Use of a loudspeaker will permit the calling subscriber to go on with his work and not pick up the receiver until he hears the called party answer.

The recycler may be stopped and disconnected at any time by pushing the "stop" button 60. If the "stop" button 60 is pushed sometime during the interval during which the motor of timer 168 is running, relay 94 will release for the reason described hereinabove. Nothing else will happen because the only relay which remains energized at that moment is relay 156. The continued energization of relay 156 is necessary so that the motor of timer 168 can be kept running until the timer 168 completes its cycle so as to be ready for its next operation. Relay 156 is finally released in the manner described hereinabove when plunger 170 of timer 168 closes contacts 172, 174 so as to momentarily energize relay 162. Inasmuch as relay 94 is released at this time, the resetting circuit of relay 110 (wires 178, 179) is broken at section C of relay 94. This prevents a feedback of the resetting impulse into wire 112 which would otherwise have the same effect as pushing the "start" button. Resetting the relay 110 at this time is unnecesary, because the starting impulse when the recycler is turned on again will reset relay 110 anyway, as was explained above.

FIGURE 8 shows an alternative embodiment of the recycler, this second embodiment being amplitude-responsive rather than repetition-rate-responsive. The circuitry of the automatic dialer, as modified by FIGURE 6, functions in the same manner as described in connection with FIGURE 7 above. The only difference between the amplitude-responsive and the repetition-rate-responsive circuit lies in the manner in which the signal identifying circuit operates. The recycler of FIGURE 8 is started in the same manner as that of FIGURE 7 by depressing any selector button 49 in FIGURE 6. This energizes relay 94 and closes the telephone line circuit as previously explained so that a dial tone will appear and be impressed on the amplifier unit 200.

The amplifier unit 200 is of the same type as amplifier unit 79 except that it has two output circuits, each equipped with a separate sensitivity adjustment and a separate relay. In addition, a voice output "*h*," "*i*" adapted to drive a loudspeaker may be provided for a purpose hereinafter described. Amplifier 201 is continuously provided with power from "hot" terminal "*a*" over wires 160 and 88. Each of the two relays 202 and 204 is of the same type as relay 86, but the amplifier unit 200 is adjusted in such a way that relay 202 will require a somewhat stronger input signal to the amplifier in order to close than does relay 204. Relay 202 is equipped with a capacitor 206 which has the same function as capacitor 90 in FIGURE 7, i.e., to make relay 202 nonresponsive to clicks or transient disturbances on the telephone line. Relay 204 is equipped with a capacitor 208 which is connected at one end to an extremity of the coil of relay 204, whereas its other end is connected to contact 204A1 of relay 204. Contact 204A2 is connected to the other end of the coil of relay 204, whereas contact 204A3 is connected through a resistor 210 to the first mentioned end of the coil of relay 204. The effect of this arrangement is as follows: When a signal is received by the amplifier and is amplified to the point where it will operate relay 204, relay 204 will not immediately be energized because capacitor 208 will first become charged. After a sufficient length of time (about one-fourth of a second) to charge the capacitor 208, the coil of relay 204 will become energized and will attract its armature. At this point, contact 204A1 will become separated from contact 204A2 and connected instead to contact 204A3. This will result in the capacitor 208 discharging itself through resistor 210. If the signal now ceases, the coil of relay 204 will become immediately de-energized, and the fact that capacitor 208 is no longer charged will prevent the armature of relay 204 from being re-attracted by capacitor 208 discharging through the coil of relay 204 when contacts 204A1 and 204A2 come together again. On the other hand, capacitor 206 will permit relay 202 to be energized a short time (about one-eighth of a second) after a sufficient signal appears, but will hold the energization of relay 202 for a similar time after the signal has ceased, while capacitor 206 discharges through the coil of relay 202. It will be seen that the net effect is that if a high amplitude signal is received, relay 204 will be energized after relay 202, but will release before relay 202. Of course, if a low-amplitude signal is received, only relay 204 will be energized.

Assuming now that a dial tone has appeared on the line (the dial and busy signals being high-amplitude signals, whereas the ringing signal is a lower amplitude signal), relay 202 will be the first to attract its armature. This causes contact 202A1 to separate from contact 202A2, which prevents the buzzer 198 and the safety relays 214, 188 from becoming actuated when relay 204 is actuated a fraction of a second later. It will be readily seen that with relay 202 energized, contact 204B1 is connected only to wires 216 and 217 which dead-end at 202A2 and 218A3.

The energization of relay 202 causes a circuit to be established between contacts 202A1 and 202A3. This supplies current from point 101 (which is energized for a reason discussed above in connection with FIGURE 7) over wire 219, section B of relay 244, wires 220, 222, contacts 202A1 and 202A3, and wire 224 to contact 218B2 of relay 218. This will cause relay 218 to become energized through contacts 218B1 and wire 226, and energization of relay 218 will be maintained, after contacts 218B1 and 218B2 have become separated, through contacts 218B1 and 218B3, the latter of which is connected to point 101 over wires 222, 220, and 219.

The energization of relay 218 also causes a connection to be established between contacts 218A1 and 218A3. This has no effect at the moment. However, in the meanwhile, current has been supplied over wires 224 and 230 to contact 232B1 of relay 232. Since relay 232 at this point is not energized, the circuit continues through contact 232B2 and wire 234 to terminal "*b*," from where it causes energization of the motor circuit of the automatic dialer in FIGURE 6, which is also connected to terminal "*b*." The actuation of the automatic dialer will cause the dial tone to disappear from the line, as explained in connection with FIGURE 7. For the reason explained above, relay 204 will be the first one to drop out, with relay 202 following a fraction of a second later. When relay 202 drops out, contact 202A1 will come together with contact 202A2 and feed current from point 101 through wires 219, 220, 222, and 217 through the now-closed contacts 218A3 and 218A1 and wire 236 to contact 232A2. This causes relay 232 to become energized and to lock itself in by means of contact 232A3, which is connected to point 101 over wires 228, 220, and 219. Energization of relay 232 breaks the connection between contacts 232B1 and 232B2, but the automatic dialer will continue to run because ring 44 and finger 46 (FIGURE 6) have in the meanwhile come into engagement.

Inasmuch as the energization of relay 232 has been caused by the release of relay 202, wires 230 and 224 now dead-end at contacts 218B2 (relay 218 being "locked in" at this time) and 202A3. Consequently, contact 232B1 goes "dead" when relay 232 becomes energized. In this position, the circuit is now ready to receive either a busy signal or a ringing signal.

Let us assume that the first signal on the line is a busy signal. As explained above, relay 202 will be the first one energized, followed closely by relay 204. The energization of relay 202 establishes a circuit between contacts 202A1 and 202A3 which causes a current to travel from point 101 through wires 219, 220, 222, 224 and 230 to contact 232B1, and from there to contact 232B3, with which 232B1 is now engaged, over wire 240 to contact 242B2 of relay 242. This energizes the coil of relay 242 via contact 242B1 and wire 243. Inasmuch as contact 242B3 is connected to the main "hot" wire 160 through the normally closed contacts of relay 244 and wire 246, relay 242 will lock itself in as soon as it becomes energized. The energization of relay 242 causes the connection between contacts 242A1 and 242A2 to be broken, as a result of which the recycler is disconnected from the telephone line. At the same time, energization of relay 242 is transmitted over wire 248 to the motor of timer 168.

In this condition, the recycler initiates a time delay which may be about five minutes, as explained previously in connection with FIGURE 7. During this time, the recycler is disconnected from the line, and the telephone can be used for other calls. At the end of the time delay set up by timer 168, plunger 170 of timer 168 momentarily bridges contacts 172 and 174, thus energizing the coil of relay 244. As a result, contacts 244A1 and 244A2 separate momentarily and cut off the current to contact 242B3, whereupon relay 242 drops out. At the same time, wire 248 goes dead and the motor of timer 168 stops. Still at the same time, the momentary energization of relay 244 also momentarily opens contacts 244B1 and 244B2, which causes momentary de-energization of wire 220. Consequently, contacts 218B3 and 232A3 will momentarily go dead, causing relays 218 and 232 to drop out. Wire 179 and section C of relay 94 in the embodiments of FIGS. 8 and 9 are provided only in connection with the circuit of FIG. 11 and may be omitted in the embodiments of FIGS. 8 and 9 if the circuit of FIG. 11 is not used.

In this condition, the recycler circuitry is in the same condition as it was before the first dial tone, and consequently, the new dial tone which will now be caused to appear on the phone line (due to the closing of contacts 242A1 and 242A2 as relay 242 drops out) will result in a repetition of the cycle described hereinabove. Let us now assume, however, that the answering signal from the called telephone is a ringing signal. Since the amplitude of the ringing signal will always be less than the amplitude of the dial tone or busy signal, only relay 204 will become energized upon the appearance of a ringing signal. When relay 204 closes, a circuit will be established between contacts 204B1 and 204B3. This time, however, since relay 202 remains released, current will flow as follows: from point 101 through wires 219, section B of relay 244, wires 220, 222, contacts 202A1 and 202A2, wire 216, section B of relay 204, and wire 250 to contact 214A2 of relay 214. This will cause relay 214 to become energized, and since contact 214A3 is connected to point 101 through wire 253, section C of relay 242, and wire 255, it will be readily seen that relay 214 will lock itself in. Energization of relay 214 closes contacts 214B1 and 214B3, which causes loudspeaker 252 to become connected to the voice output of amplifier 201 through wires 249, 251, so that the ringing signal as well as any answer of the called party will be made audible to the calling subscriber. Energization of relay 214 also causes current to flow in wire 184, thus causing the heater 186 of delay relay 188 to be energized. After an interval of about one minute, the normally closed contacts 190, 192 of relay 188 will separate, thus breaking the circuit between point 101 and wire 96, and causing the recycler to switch itself off in the manner described above in connection with FIGURE 7.

As noted in connection with FIGURE 7, a buzzer may be used instead of a loudspeaker, in which case the buzzer may be connected to wire 250 or contact 214A1, depending on whether intermittent or continuous operation is desired. If a buzzer is used, section B of relay 214 can of course be omitted.

It will be understood, incidentally, that if timer 168 in the circuit of FIGURE 8 has a plunger 170 which momentarily breaks two separate normally closed circuits at the end of the time interval, wire 176 and relay 244 can be dispensed with. In that event, wires 160, 246, 219, and 220 would be connected to the plunger terminals in a manner obvious to those skilled in the art.

Referring now to FIGURE 9, there is shown therein an alternate amplifier unit 258 which may be substituted for the amplifier unit 200 of FIGURE 8, in order to make the system of FIGURE 8 frequency-responsive rather than amplitude-responsive.

Essentially, the circuitry of the frequency-responsive amplifier unit 258 is the same as that of the amplitude-responsive amplifier unit 200, except that the signal from the telephone line is fed through terminals "*j*" and "*k*" into preamplifier 260, which in turn distributes a slightly amplified signal to a pair of tuned amplifiers 262 and 264, and over wires 249, 251, through terminals "*h*" and "*i*" to loudspeaker 252. All the amplifiers are continuously supplied with power over wire 88 and terminal "*m*." The tuned amplifiers may be of any desired design, one possible design being shown, as a matter of illustration, in FIGURE 129 on page 126 of the publication "Radar Electronics Fundamentals" published by the Bureau of Ships, Navy Department, Washington, D.C., in June 1944. In any event, tuned amplifier 262 is so arranged as to pass only signals having the frequency of the dial tone or busy signal (i.e., 510 cycles per second), whereas tuned amplifier 264 is tuned so as to pass only signals having the frequency of the ringing signal (i.e., 21 cycles per second). The output of tuned amplifier 262 is fed to relay 268, whereas the output of amplifier 264 is fed to relay 270. The coils of relays 268 and 270 are bridged by capacitors 272 and 274 respectively, each of these being designed to give the relay sufficient sluggishnesss to avoid its being actuated by spurious transients. Consequently, whenever a dial tone or busy signal appears on the line, only relay 268 will be energized, and when a ringing signal appears on the line, only relay 270 will be energized.

It will be readily observed that when the amplifier unit 258 of FIGURE 9 is substituted for the unit 200 of FIGURE 8, terminal "r" of unit 258 will be connected to wire 217, terminal "p" to wire 224, terminal "o" to wire 222, terminal "n" to wire 250, terminal "m" to wire 88, terminals "j" and "k" to the upper and lower ends, respectively, of the secondary coil 78 of audio transformer 74, and terminals "h" and "i" to wires 251 and 249, respectively. This being so, it will be readily seen that energization of relay 268 in the amplifier unit 258 of FIGURE 9 will have the same effect as energization of relay 202 in the amplifier unit 200 of FIGURE 8, whereas energization of relay 270 in unit 258 of FIGURE 9 will have the same effect as energization of relay 204 alone in unit 200 of FIGURE 8. Inasmuch as, in the frequency-responsive embodiment, relays 268 and 270 cannot be energized at the same time, wire 216 can be connected directly to wire 222 rather than to wire 217, if desired (see FIGURE 9).

FIGURE 10 shows an overall view of a telephone set being used in connection with the apparatus of our invention. The numeral 12 designates the telephone set, the numeral 14 the automatic dialer, and the numeral 16 the box containing the recycler. The "stop" button is shown at 60 and the pilot light at 66. Buttons 49 opposite name tags 280 represent the buttons by which the number of the subscriber to be called is chosen. As stated above, each button 49 has a pair of override contacts which are connected in parallel with the override contacts of all the other buttons and which together constitute the contacts of "start" switch 48 in FIGURE 6. Thus, the recycler is started by depressing any one of the buttons 49 all the way.

In order to allow the use of the recycler not only with the numbers pre-set on dialer 14, but with any number, a bank of seven rotary switches 284 may be mounted on the front of the dialer 14. The subscriber can rapidly set up any desired number on switches 284, then start the recycler by pushing the button 49 marked "Start" (FIG. 10). This will cause the dialer to dial the number set up on the switches 284. It will be understood that switches 284 and the button 49 marked "Start" are connected in the same manner as the other selector buttons and selector switches, as shown in Patent No. 3,074,059.

FIGURE 11 shows an optional modification of the devices of FIGURES 7, 8 or 9, which makes each of these devices able to cope with the situation in which the called party does not answer. In such a situation, it is desirable to call back within approximately twenty minutes. The modification of FIGURE 11 achieves this by a ringing signal counting circuit which is tied into the circuits of FIGURE 7, 8 or 9 in the following manner: the desired circuit is prepared for the addition of the circuitry of FIGURE 11 by removing delay relay 188 and wires 184, 100, and 96, disconnecting wire 68 from terminal "d," and disconnecting contact 182B1 (FIG. 7) or 214A1 (FIG. 8 or 9) from the coil of its relay. This having been done, the circuitry of FIGURE 11 is tied into the prepared circuit as shown in FIGURE 11 and explained hereafter.

The structure and operation of the device of FIGURE 11 is as follows: one end of the stepping coil 280 of a stepping relay 282 is connected to wire 196 (FIG. 7) or 250 (FIG. 8 or 9). Inasmuch as a current impulse appears in wire 196 or 250 each time a ringing signal appears on the line, the stepping relay 282 will step one step in a counterclockwise direction with each ringing signal. If less than ten ringing signals occur within a seventy-five second period (i.e., the called party answers within one minute), the switching arm 284 of relay 282 will come to rest in one of the first nine active positions which are all tied together by wire 286. In each of these positions, current is supplied from contact 182B1 (FIG. 7) or 214A1 (FIG. 8 or 9) over wire 288 through switching arm 284 and wire 286 to heater 290 of a delay relay 292. Relay 292 is a delay relay of any convenient type having normally closed contacts and having a time delay of about seventy-five seconds, such as, for example, Amperite Model 115 NC 75. If, at the end of the seventy-five second delay period, less than ten ringing signals have occurred, it will be seen that contacts 294, 296 of relay 292 will open. Since contact 292 is connected to the "stop" terminal and contact 294 is connected to point 101, this opening will deprive wire 102 of current and will cause relay 94 to drop out, thus shutting the recycler off. Reset coil 308 of relay 282 will be actuated by the starting impulse appearing in wire 92, to which coil 308 is connected over wire 326, the next time the recycler is started. This reset operation is the same as that used to reset coil 108 in FIG. 7.

If the called party does not answer, a tenth ringing signal will eventually appear on the line before the expiration of the seventy-five second delay. When this happens, switching arm 284 of relay 282 will step onto terminal 310 of stepping relay 282. This will cause current to flow from point 101 via relay 182 or relay 214 and wire 288 (FIG. 11) through switching arm 284 and contact 310 over wire 312 to contact 314B2 of relay 314. This will cause energization of relay 314, which in turn will lock itself in because contact 314B3 is connected to current-carrying wire 101 through wire 302 and contacts 300A2 and 300A1 of relay 300. At the same time, current is supplied over wire 316 to a twenty minute interval timer 318 similar to timer 168 and adjustable by knob 305 (FIG. 10), equipped with a plunger 320 which is adapted to momentarily close contacts 324, 326 at the expiration of the twenty minute period. Contact 324 is connected to wire 160 through wire 301. Contact 326 is connected to the coil of relay 300. Consequenlty, the operation of plunger 320 has the effect of momentarily energizing relay 300. This causes momentary separation of contacts 300A1 and 300A2, whereupon relay 314 drops out. Hence, the expiration of the twenty minute delay will initiate a new dialing cycle. At the same time, the momentary energization of relay 300 momentarily energizes wire 179, which is connected to wire 322 through section C of relay 94 and wire 92, thus actuating the reset coil 308 of relay 282. Section B of relay 300 is inserted in the coil circuit of relay 182 or 214 to cause relay 182 or 214 to drop out when the twenty minute interval is completed.

Provision is made to disconnect the recycler from the telephone line during the twenty minute interval by connecting contact 314A1 and 314A2 of relay 314 to terminal "d" and wire 68, respectively. Since relay 314 is energized only during the twenty minute interval, this will result in opening the telephone line circuit during that twenty minute interval, so that the telephone can be used freely during that period. If the "stop" button 60 is pushed while timer 318 is running, it will stop, and on its next use will run only the remainder of its cycle.

In operation, the calling subscriber, wishing for example to dial one of the numbers which are pre-set in the automatic dialer 14, merely depresses the button 49 corresponding to the desired party all the way and then releases it. Since the full depressing of a button 49 starts the recycler, the pilot light 66 will indicate that the device has started, and thereupon the subscriber need merely leave the machine alone. When a ringing signal is obtained from the telephone of the desired subscriber, the device will signify that fact with a buzz or other desired indication. The calling subscriber thereupon lifts his receiver and is ready to start the conversation. Depending on the connection of the buzzer as discussed hereinabove, the calling subscriber may at this time wish to push the "stop" button 60 so as to stop the buzzer and disconnect the recycler from the line. Of course, this must not be done until the receiver has been lifted off its cradle, since pushing the "stop" button 60 while the receiver is still on the hook will break the connection. In the event that the calling subscriber fails to push the "stop" button for any reason, whether purposely or not, the recycler will disconnect itself from the telephone line and shut itself off approximately one minute after the first ringing signal has appeared.

If the modification of FIG. 11 is used, the recycler will automatically re-dial the selected number after a twenty minute interval in the event the called party fails to answer. It will be appreciated that if the circuit of FIG. 11 is used, relay 204 (FIG. 8) must be made non-speech-responsive (e.g. by feeding it through a tuned circuit tuned to the frequency of the ringing signal), just as relay 86 (FIG. 7) and for the same reason, i.e., to prevent operation of stepping relay 282 by voice pulses. Relay 270 (FIG. 9) is of course inherently non-voice-responsive, since it is operated by a tuned amplifier.

If the subscriber lifts his receiver while the recycler is operating, no disturbance of the recycler operation will result. This is true because except during dialing, lifting the receiver merely connects the receiver in parallel with audio transformer 74, which has no effect on the circuit. Since the amplifier units do not respond to speech, even speaking into the receiver has no effect. During the dialing operation, relay 52 completely disconnects the receiver from the telephone line.

If the recycler is started, or the five minute time interval is up, while a conversation with a third party is in progress. the recycler will not actuate the dialer until the dial tone appears after the third party hangs up.

It sometimes happens that a single short ringing signal is immediately followed by a busy signal. The circuit of FIGURE 7 will correctly interpret this as a busy signal and will act accordingly. The circuit of FIGURES 8 and 9 will at first interpret this condition as a ringing signal and will sound the buzzer momentarily. However, when the busy signal appears, relay 242 will become energized, and section C of relay 242 will open, thereby disconnecting contact 214A3 and wire 253 from point 101 and wires 102 and 255. This causes relay 214 to drop out, whereupon the circuit will continue to operate as if it had received a busy signal in the first place.

It will be seen that the present invention provides a reliable and fool-proof recycling system for dial telephones. Obviously, in circuitry of this type, numerous modifications may be made by persons skilled in the art to adapt the device to various uses and requirements. It is therefore to be understood that the above-described embodiments have been cited as illustrations only, and it is not in any way desired to limit the scope of this invention except by the scope of the following claims.

Having thus described the invention, what is claimed and desired to be secured by Letters Patent is:

1. In combination with an automatic telephone dialer connected to a telephone line and having means for keeping itself energized for one complete dialing cycle in response to a starting impulse, a recycling control device for said dialer comprising means for connecting said control device to said telephone line so as to cause generation of a dial tone on said telephone line, selector means responsive to the appearance of signals on said telephone line for channeling an electrical impulse into a selected one of a plurality of channels depending upon the number of signals appearing on said telephone line during a first predetermined interval, means responsive to the appearance of an impulse in a first of said channels for imparting a starting impulse to said dialer, means responsive to the appearance of an impulse in a second of said channels for disconnecting said control device from said telephone line for a second predetermined interval, an indicator, and means responsive to the appearance of an impulse in a third of said channels for actuating said indicator.

2. The device of claim 1, further comprising speech-eliminating means for rendering said selector responsive only to signals of a predetermined minimum duration.

3. In combination with an automatic telephone dialer connected to a telephone line and having means for keeping itself energized for one complete dialing cycle in response to a starting impulse, a recycling control device for said dialer comprising means for connecting said control device to said telephone line so as to cause generation of a dial tone on said telephone line, means responsive to the appearance of a signal of at least a predetermined amplitude for energizing a circuit, means responsive to the first energization of said circuit following connection of said recycling control device to said telephone line for imparting a starting impulse to said dialer, means responsive to a subsequent energization of said circuit for disconnecting said control device from said telephone line for a predetermined interval of time, an indicator, and means responsive to the appearance on said telephone line of a signal of less than said predetermined amplitude for actuating said indicator.

4. The device of claim 3, further comprising speech-eliminating means for rendering said last-named means responsive only to signals of a predetermined minimum duration.

5. The device of claim 3, further comprising a tuned circuit connected so as to make said last-named means responsive only to signals of a predetermined frequency.

6. In combination with an automatic telephone dialer connected to a telephone line and having means for keeping itself energized for one complete dialing cycle in response to a starting impulse, a recycling control device for said dialer comprising means for connecting said control device to said telephone line so as to cause generation of a dial tone on said telephone line, means responsive to the appearance of a signal of a first predetermined frequency for energizing a circuit, means responsive to the first energization of said circuit following connection of said control device to said telephone line for imparting a starting impulse to said dialer, means responsive to a subsequent energization of said circuit for disconnecting said control device from said telephone line for a predetermined interval of time, an indicator, and means responsive to the appearance on said telephone line of a signal of a second predetermined frequency for actuating said indicator.

7. Apparatus for controlling an automatic telephone dialing device associated with a telephone set to automatically establish a communication over a telephone line comprising: an input connected in parallel with said telephone set; an amplifier; line seizing means for connecting said amplifier to said input and loading said line to cause a dial tone to be produced thereon; dial tone recognizing means coupled to the output of said amplifier and actuated in response to a predetermined characteristic of said dial tone to operate said dialing device when said dial tone appears on said line, to simultaneously disconnect said telephone set and input from said line, and to reconnect said set and input to said line when said dialing device has completed its cycle; and busy-signal recognizing means actuated in response to a predetermined characteristic of a busy signal to disconnect said amplifier and load from said input for a predetermined interval of time when said busy signal appears on said line.

8. Apparatus for controlling an automatic telephone dialing device associated with a telephone set to automatically establish a communication over a telephone line, comprising: an input connected in parallel with said telephone set; an amplifier; line seizing means for connecting said amplifier to said input and loading said line to cause a dial tone to be produced thereon; dial tone recognizing means coupled to the output of said amplifier and actuated in response to a predetermined characteristic of said dial tone to operate said dialing device when said dial tone appears on said line, to simultaneously disconnect said telephone set and input from said line, and to reconnect said set and input to said line when said dialing device has completed its cycle; busy-signal recognizing means actuated in response to a predetermined characteristic of a busy signal to disconnect said amplifier and load from said input for a first predetermined interval of time when said busy signal appears on said line; ring-signal recognizing means actuated in response to a predetermined characteristic of a ringing signal to provide an indication of the presence of said ringing signal on said line; lock-out means operative upon expiration of a predetermined length of time following actuation of said ring-signal recognizing means to deenergize said apparatus; and no-answer recognizing means operative to disable said lock-out means and to disconnect said amplifier and load from said input for a second predetermined interval of time when an excessive number of consecutive ringing signals appear on said line.

9. Apparatus for repetitively dialing a telephone number until the called number is free and providing an indication of that fact, without interfering with normal use of the calling line, comprising: a telephone set; a dialer; an electrical load element having an impedance generally equal to that of the receiver of said telephone set and connectable in parallel therewith; a line switch relay so connecting said load upon energization of said apparatus; an amplifier having an input connected to said load and an output arranged to close a pair of contacts during the presence of a tone at said input; a stepping relay connected so as to move one step each time said contacts close; delay means arranged to energize the stepping arm of said stepping relay upon expiration of a time interval after the first closing of said contacts sufficient to produce more busy signals than ringing signals; a first stationary contact on said stepping relay connected to said dialer so as to start it when energized; a secondary stationary contact on said stepping relay connected to start a timer and to disconnect said load when energized; said timer being connected to reconnect said load and to reset said stepping relay upon expiration of a predetermined time interval after being started; and a third stationary contact on said stepping relay connected to actuate indicating means when energized.

10. A recycling control apparatus for a pulse code transmitter comprising: a receiving device for receiving a plurality of signals each having at least one identifying characteristic, said one characteristic being the frequency of the signal; a filter circuit having an input connected to said receiving device and a plurality of outputs, said filter circuit being arranged to divert each of said signals to one of said outputs in accordance with its frequency; transmitter actuating means responsive to the appearance of a signal at a first one of said outputs for operating said pulse code transmitter; timer means actuatable by the appearance of a signal at said first output to operate for a predetermined length of time; switching means for alternately connecting said transmitter-actuating means and said timer means to said first output in accordance with a predetermined pattern; interrogating means operated by said timer upon expiration of said predetermined length of time to cause receipt by said receiving device of a signal of such frequency as to appear at said first output; and indicating means responsive to the appearance of a signal at a second of said outputs for indicating the receipt of said last-named signal.

11. A recycling control apparatus for a pulse code transmitter for transmitting pulse code signals over a communication channel, comprising: a receiving device connectable to said communication channel to receive therefrom a plurality of signals each having at least one identifying characteristic, said one characteristic being the amplitude of the signal; a selector circuit connected to said receiving device and having a plurality of outputs; said selector circuit being arranged to energize selected ones of said plurality of outputs upon receipt of said signals depending upon the amplitude of the received signal; transmitter actuating means connectable to said selector circuit and responsive to the energization of a first predetermined number of said outputs for operating said pulse code transmitter; timer means connectable to said selector circuit and actuatable by the energization of said first predetermined number of said outputs to operate for a predetermined interval of time; switching means for alternately connecting said transmitter-actuating means and said timer means to said first predetermined number of said outputs in a predetermined sequence; interrogating means actuated by said timer upon expiration of said time interval to cause receipt by said receiving device of a signal of such amplitude as to cause energization of said first predetermined number of said outputs if said communication channel is clear; and indicating means responsive to energization of a second predetermined number of said outputs for indicating the receipt of a signal adapted to cause said last-named energization.

12. In combination: a telephone line; a telephone set connected thereto; an automatic dialer connectable to said line; a recycling control apparatus connectable to said line comprising dial-tone recognizing means connected to said dialer and responsive to the appearance of a dial tone on said line when said recycling control apparatus is connected thereto for actuating said dialer and connecting it to said line; disconnecting means for disconnecting said recycling control apparatus from said line for a predetermined interval of time upon actuation of said disconnecting means and busy-signal recognizing means responsive to the appearance of a busy signal on said line when said recycling control apparatus is connected thereto for operating said disconnecting means; said recycling control apparatus when connected to said line closing the circuit of said line so as to cause it to generate a dial tone if it is free, whereby said recycling control apparatus is reconnected to said line upon expiration of said interval of time regardless of whether or not said telephone set is in use but cannot operate said dialer again if said telephone set is in use until said use has ceased and a dial tone appears on said line.

13. The device of claim 12, further comprising means for disconnecting said telephone set from said telephone line while said dialer is actuated.

References Cited in the file of this patent

UNITED STATES PATENTS

| | | |
|---|---|---|
| 2,576,189 | Olliver | Nov. 27, 1951 |
| 2,697,140 | Cornell | Dec. 14, 1954 |
| 2,861,131 | Villmann | Nov. 18, 1958 |